United States Patent [19]

Cameron et al.

[11] Patent Number: 5,342,562
[45] Date of Patent: Aug. 30, 1994

[54] REACTION PROCESSING OF AlN/SiC COMPOSITES AND SOLID SOLUTIONS

[75] Inventors: Craig P. Cameron, Ellicott City, Md.; Roy W. Rice, Alexandria, Va.

[73] Assignee: W. R. Grace & Co.-Conn., New York, N.Y.

[21] Appl. No.: 675,360

[22] Filed: Mar. 21, 1991

[51] Int. Cl.$^5$ ............................................. C04B 33/32
[52] U.S. Cl. ........................................ 264/63; 264/65; 50/89; 50/90
[58] Field of Search .................. 501/88, 89, 92, 96, 501/97, 99, 100; 264/65

[56] References Cited

U.S. PATENT DOCUMENTS

| | | | |
|---|---|---|---|
| 4,141,740 | 2/1979 | Cutler et al. | 106/44 |
| 4,332,755 | 6/1982 | Murata | 264/65 |
| 4,569,922 | 2/1986 | Suzuki | 501/89 |
| 4,569,922 | 2/1986 | Suzuki | 501/89 |
| 4,680,278 | 7/1987 | Inoue et al. | 501/98 |
| 4,876,941 | 10/1989 | Barnes | 89/36.02 |
| 4,919,868 | 4/1990 | Huang | 264/65 |

*Primary Examiner*—Donald P. Walsh
*Assistant Examiner*—John N. Greaves
*Attorney, Agent, or Firm*—Steven Capella

[57] ABSTRACT

The invention encompasses a method of forming a composition containing an AlN-SiC composite and/or solid solution, the method comprising:
  a) combining sources of silicon nitride, aluminum, and carbon to form a mixture, and
  b) heating the mixture whereby the sources react to form an AlN-SiC composite and/or solid solution.

The mixture may be shaped before the reacting step. Also, the reacted mixture may be further heated to produce a densified body.

5 Claims, No Drawings

REACTION PROCESSING OF AlN/SiC COMPOSITES AND SOLID SOLUTIONS

BACKGROUND OF THE INVENTION

Structural ceramic materials generally show many advantages in high performance materials applications because of their high mechanical strengths and hardness properties and low weight. These features make many of these ceramic materials attractive for use in military applications such as armor for vehicles. Numerous non-military applications for these materials are just beginning to be explored and implemented.

Unfortunately, a major disadvantage of most structural ceramic materials is high cost. High cost limits the use of these materials both in military and non-military applications.

The high cost of many structural ceramics may be partly attributed to high cost of the starting ceramic powders which are to be shaped and densified to form structural ceramic parts. The starting powders are often made by energy-intensive processes or by other expensive methods adapted to produce high purity starting powders. Generally, it has been preferred to minimize the impurity contents of starting powders in order to maximize the performance of the ultimate ceramic part.

Some prior art processes have used chemical reactions in the formation of solid solutions containing AlN and SiC, however these processes generally use silicon carbide as a starting material and consequently still involve substantial starting material expense. U.S. Pat. Nos. 4,141,740 and 4,569,922 may be noted in this regard.

Needless to say, it would be highly desirable to reduce these costs associated with structural ceramics. Indeed, reduction of cost is necessary if structural ceramics are to be used in broader non-military applications.

SUMMARY OF THE INVENTION

The present invention overcomes some of these problems of high cost structural ceramics. Namely, the invention entails the production of a high performance structural ceramic based on AlN-SiC composites and/or solid solutions using low cost starting materials.

In one aspect, the invention encompasses a method of forming a composition containing an AlN-SiC composite and/or solid solution, the method comprising:
a) combining sources of silicon nitride, aluminum, and carbon to form a mixture, and
b) heating the mixture whereby the sources react to form an AlN-SiC composite and/or solid solution.

In another aspect, the invention embraces a method of forming a sintered ceramic material containing an AlN-SiC composite and/or solid solution, the method comprising:
a) combining sources of silicon nitride, aluminum, and carbon to form a mixture;
b) compacting the mixture to form a shape;
c) heating the shape whereby the sources react to form an AlN-SiC composite and/or solid solution; and
d) densifying the reacted shape.

A more specific feature of the invention is the use of the reaction:

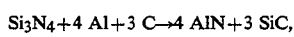

to form AlN-SiC composites and/or solid solutions.

The invention further encompasses densified AlN-SiC composite and/or solid solution ceramics having a density of at least about 3.24 gm/cm$^3$ and a Vickers hardness of at least about 2540 kg/mm$^2$ (500 g.load).

DETAILED DESCRIPTION OF THE INVENTION

The invention centers around the use of a reaction processing technique to produce the compositions and sintered ceramic materials of the invention.

The method centers on use of the reaction:

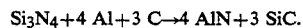

The starting reactants, (i.e., silicon nitride, aluminum metal and carbon) are combined to form a reactant mixture. The mixture is then formed into a shape. The shape is heated to initiate the reaction shown above. As the reaction progresses, the temperature is increased due to the energy released by the reaction and by externally supplied energy. In this way, the temperature of the reacted composition may be elevated to a point where the reacted composition begins to densify. The shaped reacted composition may be densified to the desired degree at the elevated temperature.

The silicon nitride used in the starting reactant mixture may be from any known source or combination of sources. The silicon nitride used does not have to be of very high purity. Refractory grade silicon nitride may be used as a low cost silicon nitride source. Indeed, the presence of some of the impurities may be advantageous.

The elemental aluminum and elemental carbon used can be from any known sources for those materials.

The starting reactant mixture may deviate from stoichiometric proportions if one desires to have an amount of certain reactants remain in the product (e.g., excess silicon nitride). Also, a cermet containing free aluminum may be generated by adding excess aluminum metal source to the starting reactant mixture.

Also, the starting reactant mixture may contain additional components not listed in the reaction above. These additional components may be impurities in the reactant sources or may be deliberate additions. For example, one may wish to add a sintering aid such as CaO or CaCO$_3$ to the starting reactant mixture so that densification of the reaction product will occur more easily.

One advantage of the invention is that certain (normally undesirable) impurities present in low cost starting materials can be converted to more desirable compounds during the course of the reaction. For example, low cost silicon nitride sources often contain significant amounts of SiO$_2$ and free silicon impurities which are normally undesirable since they can form inter-granular phases which deter densification and/or degrade high temperature performance of the sintered product. Using the reaction method of the invention, however, causes conversion of at least some of these impurities to alumina (Al metal reacting with the oxygen of SiO$_2$) and silicon carbide. Thus, the otherwise harmful impurities are converted to advantageous (or at least less harmful) ceramic materials.

According to the method of the invention, the carbon source may include a carbonizable binder which assists in retaining the shape of the molded reaction mixture as well as provides carbon for the reaction. Other binders which do not leave residual carbon may also be employed.

The starting mixture can be molded using any conventional technique such as pressing, extrusion or injection molding.

The reaction to produce AlN and SiC is preferably performed directly in the apparatus in which the shape is to be densified. Preferably, the reaction starts during the process of heating the shape to sintering temperature.

The sintering temperature used is preferably at least about 1650° C., more preferably at least about 1700° C.

In one preferred embodiment, the starting mixture is loaded as a powder into a hot press die. The powder is then pressed and caused to react by heating to an intermediate temperature. The temperature is then increased to cause densification of the reaction product by hot pressing at about 1700° C.

Typical densities of the sintered products are at least about 3.24 gm/cm$^3$ with hardness values of at least about 2540 kg/mm$^2$ measured by the Vickers hardness test (500 gm load). The products also achieve 4 point bend strengths (MOR) of at least about 55,000 psi.

Example 1

A starting reaction mixture was formed from refractory grade silicon nitride powder sold by Lilleby Co. (89.5 gm), aluminum powder (Alcan 105) sold by Alcan Co. (68 gm), carbon powder sold by Alfa Corp. (22.8 gm), and calcium carbonate sold by Baker Co. (5.0 gm). The reactants were milled in isopropanol for 4 hours. The resulting slurry was filtered and dried. The powder mixture was then placed in a die and hot pressed at 1700° C. for 1 hour.

During the heating to 1700° C. the powder mixture underwent reaction and then densifying to form a sintered ceramic body. The hardness of this sintered body was measured using the Vickers hardness test to yield a value of 2540 kg/mm$^2$ (500 gm load). This product had a density of about 3.24 gm/cm$^3$.

It should be understood that the invention is not limited to the reactants, proportions, process steps or results recited in the example above.

What is claimed is:

1. A method of forming a sintered ceramic shape consisting essentially of an AlN-SiC composite, said method comprising:
   a) combining silicon nitride, elemental aluminum, and a source of carbon, said carbon source being selected from the group consisting of elemental carbon, carbonizable binders, and mixtures thereof, to form a mixture;
   b) compacting said mixture to form a shape;
   c) heating said shape whereby said mixture reacts to form an AlN-SiC composite, said reacting including the reaction: $Si_3N_4 + 4\ Al + 3C \rightarrow 4\ AlN + 3\ SiC$; and
   d) densifying said reacted shape.

2. The method of claim 1 wherein said silicon nitride includes refractory grade silicon nitride and wherein a sintering aid is added to said mixture prior to compacting.

3. The method of claim 1 wherein said densifying is performed by hot pressing.

4. The method of claim 1 wherein said densifying is performed by hot isostatic pressing.

5. The method of claim 2 wherein said sintering aid is selected from the group consisting of CaO and $CaCO_3$.

* * * * *